United States Patent [19]

Greenhill et al.

[11] Patent Number: 4,580,239

[45] Date of Patent: Apr. 1, 1986

[54] REMOTE STATION OF A COMPUTER SYSTEM

[75] Inventors: Katherine L. Greenhill, Houston; Frank L. Lankford, Bellaire, both of Tex.

[73] Assignee: Texaco Inc., White Plains, N.Y.

[21] Appl. No.: 515,740

[22] Filed: Jul. 21, 1983

[51] Int. Cl.⁴ .................................................. G06F 3/00
[52] U.S. Cl. .................................................... 364/900
[58] Field of Search ........................................ 370/56; 364/200 MS File, 900 MS File

[56] References Cited

U.S. PATENT DOCUMENTS

| | | | |
|---|---|---|---|
| 3,772,656 | 11/1973 | Serrachioli | 364/200 |
| 4,124,889 | 11/1978 | Kaufman et al. | 364/200 |
| 4,387,440 | 6/1983 | Eaton | 364/900 |
| 4,387,442 | 6/1983 | Stuehler | 364/900 |
| 4,388,686 | 6/1983 | Haid | 364/200 |
| 4,425,616 | 1/1984 | Woodwell | 364/200 |

OTHER PUBLICATIONS

"Motorola Linear Integrated Circuit", Technical Information Center of Motorola, Inc., 1979, pp. 5/32–5/43.

"Interface Data Book", National Semiconductor, 1979, pp. 1/18–1/23.

Primary Examiner—Raulfe B. Zache
Assistant Examiner—David Y. Eng
Attorney, Agent, or Firm—Robert A. Kulason; Ronald G. Gillespie

[57] ABSTRACT

The present invention is an improvement to a station at a remote location from a distant computer which communicates at a predetermined rate prior to said improvement by way of telephone lines. A modem is connected to the telephone line which converts signals carried by the telephone lines to signals suitable for use with a controller and converts signals from a controller to signals suitable to be carried by the telephone lines. There are at least two controllers, each controller is connected to a plurality of terminals. Apparatus connects the modem to the controllers which derives a set of signals for each controller in accordance with the signals from the modem and derives a set of signals for the modem from signals provided by the controllers in a manner so that the remote station communicates with the computer at substantially a predetermined rate.

9 Claims, 3 Drawing Figures

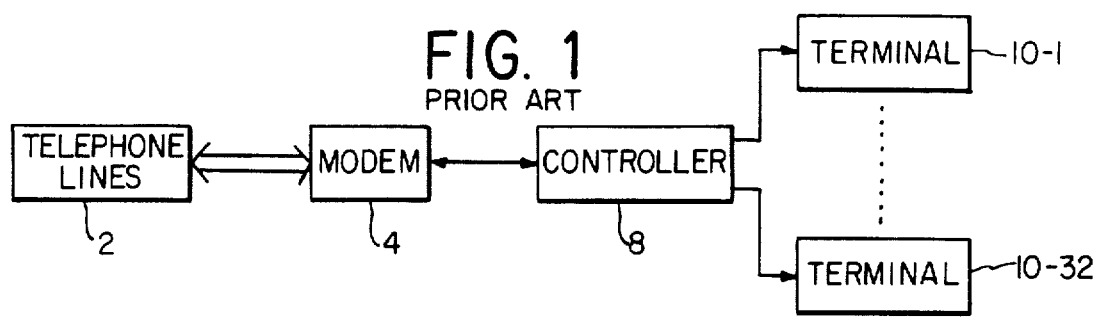
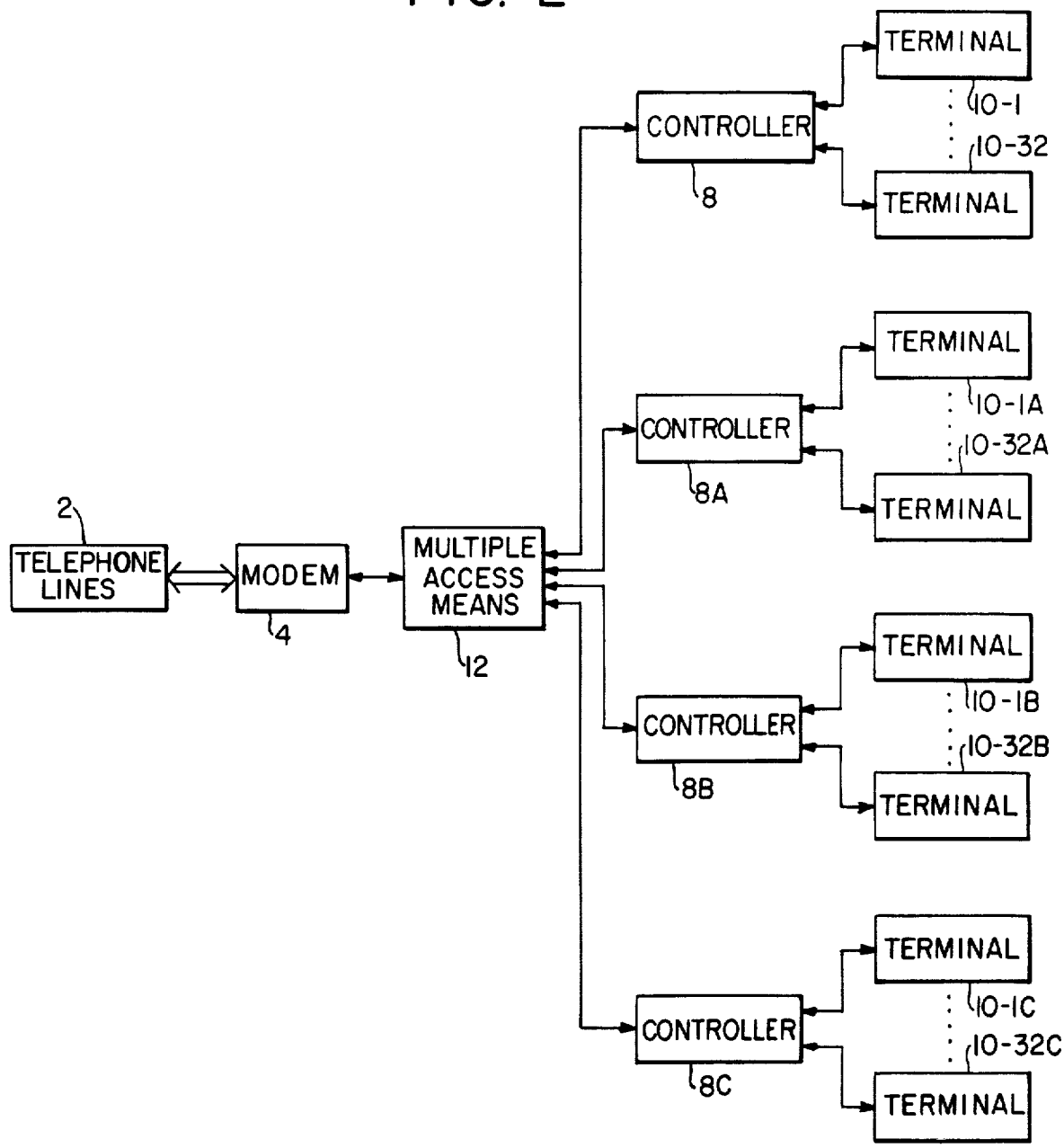

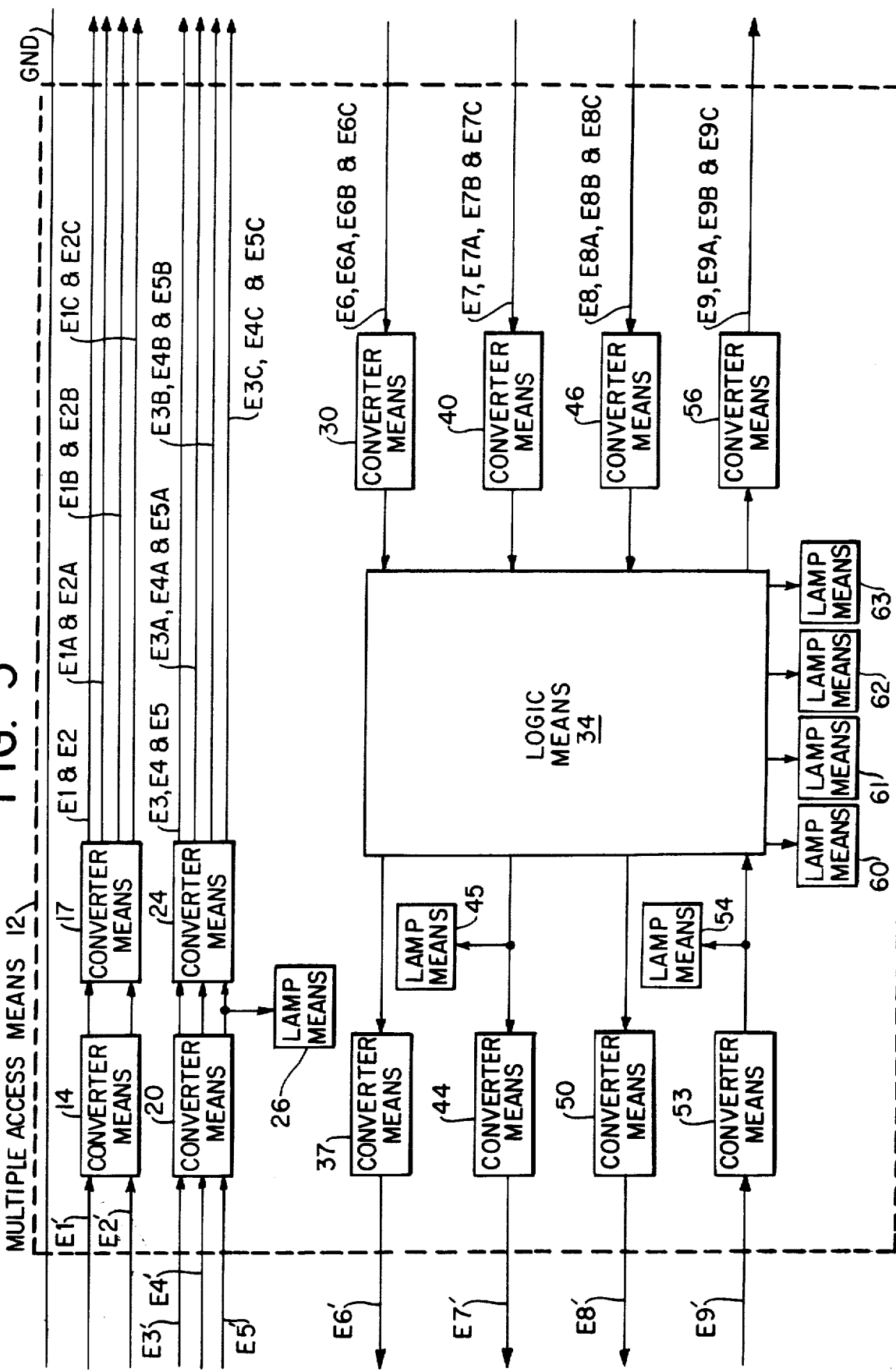

4,580,239

1

REMOTE STATION OF A COMPUTER SYSTEM

BACKGROUND OF THE INVENTION

Field of the Invention

The present invention relates to computer systems in general and, more particularly, to computer systems wherein remote stations are in communication by way of telephone lines with a centrally located computer.

SUMMARY OF THE INVENTION

The present invention is an improvement to a station at a remote location from a distant computer which communicates at a predetermined rate prior to said improvement by way of telephone lines. A modem is connected to the telephone line which converts signals carried by the telephone lines to signals suitable for use with a controller and converts signals from a controller to signals suitable to be carried by the telephone lines. There are at least two controllers, each controller is connected to a plurality of terminals. Apparatus connects the modem to the controllers which derives a set of signals for each controller in accordance with the signals from the modem and derives a set of signals for the modem from signals provided by the controllers in a manner so that the remote station communicates with the computer at substantially a predetermined rate.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a simplified block diagram of a remote station which communicates with a centrally located computer by way fo telephone lines.

FIG. 2 is a simplified block diagram of an improved remote station constructed in accordance with the present invention.

FIG. 3 is an detailed block diagram of the multiple access means shown in FIG. 2.

DESCRIPTION OF THE INVENTION

It is a general practice in industry to have remote stations having computer terminals communicate with a centrally located computer by way of telephone lines. FIG. 1 shows such a station in which telephone line 2 are connected to a conventional type modem 4 (modulator-demodulator) such as provided by the telephone equipment manufacturer.

Modem 4 receives and provides signals to a controller 8 which may be of the type manufactured by the International Business Machine Company as their part No. 3274-31C. Controller 8 provides signals to, and receives signals from, a plurality of conventional type computer terminals 10-1 through 10-32.

Further modem 4 and controller 8 provide signals to each other with two types of signals. One type of signal meets a specification that generally is designated V.35 and hence this type of signal is referred to as a V.35 signal. The aforementioned specification was developed by International Telegraph and Telephone Consultative Committee of the International Telecommunication Union. The specification sets forth among other things, that given two terminals A and B, a binary one is signified when terminal A is positive with respect to terminal B, and a binary zero when the polarity is reversed. The voltage between terminals A and B is 0.55 volts ±20%. The other type of signal is a RS 232 signal used in the system of FIG. 1. With the RS 232 signals, a binary one is represented by a +3 to +15 volts and a binary zero is represented by a −2 to −15 volts.

With reference to FIG. 2, the system of the present invention has permitted expansion in the number of controllers and terminals that can now be serviced by telephone lines 2 and modem 4 without loss of speed or deterioration of signal quality. Telephone lines 2 and modem 4 operate as hereinbefore explained for the conventional system of FIG. 1. Now, however, the signals are provided to multiple access means 12 which in turn provides signals to and receives signals from controllers 8 through 8C, as hereinafter explained.

Each controller of controllers 8, 8A, 8B and 8C still handles 32 terminals as before. However, with the increase in controllers there is a corresponding increase in terminals so that now modem 4 is in communication with 128 terminals identified as 10-1 through 10-32, 10-1A through 10-32A, 10-1B through 10-32B and 10-1C through 10-32C.

As noted earlier, the increase in capability is achieved without loss of speed. An obvious approach to increase capability results in decreased transmission speed. For example, the normal speed of the FIG. 1 conventional system is 56,000 bits per second. By dividing a single communication line into five communication lines, the rate drops to 9,600 bits per second for each line and the system. In this obvious approach, each line can support up to 16 terminals or a total of 80 terminals. Thus the present invention not only maintains the speed at 56,000 bits per second (500% greater than obvious expanded system) but has more terminals, 120 versus 80 (150% over the obvious expanded system capability).

Referring to FIGS. 2 and 3, modem 4 provides six signals E1', E2', E3', E4', E5' and E9' and receives three signals E6', E7' and E8'. Table I is provided to facilitate identification of the signals and their functional names and signal type.

TABLE I

| Signal | Name & Function | Signal Type |
|---|---|---|
| E1 | Carrier Detect-Valid data on line | RS 232 |
| E2 | Data Set Ready-Modem is Energized | RS 232 |
| E3 | Transmit Clock-Provided by Terminal For Modem to Read Another Bit | V.35 |
| E4 | Receive Clock-For Terminal to Read Another Bit of Received Data. | V.35 |
| E5 | Receive Data-Terminal is Receiving Data | V.35 |
| E6 | RTS-Request by a Terminal to Send Data | RS 232 |
| E7 | Transmit Data-Terminal is Sending Data | V.35 |
| E8 | External Transmit Clock-For Modem to Read Another Bit of Data For Transmisson | V.35 |
| E9 | Modem Clear to Send-Modem has Cleared | RS 232 |

Referring now to FIG. 3, multiple access means 12 uses TTL type signals, i.e. a binary one is substantially 5 volts, a binary zero is substantially 0 volts. Signals E1' and E2' are provided to converter means 14 where they are converted from RS 232 type signals to TTL signals. Converter means which convert RS 232 type signals to TTL type signals may be of the type manufactured by Motorola Inc. as their part number 1489. Converter means 14 provides converted signals to another converter means 17 which provides four groups of two RS 232 signals E1, E2, E1A, E2A, E1B, E2B, E1C and E2C. Converter means for converting TTL type signals to RE 232 type signals may be of the type manufactured by Motorola as their part MC 1488.

Each group of signals from converter means 17 is provided to a corresponding controller. Thus, signals E1 and E2 are provided to controller 8, signals E1A and E2A are provided to controller 8A; signals E1B and E2B, are provided to controller 8B and signals E1C and E2C are provided to controller 8C.

In general, signals having an alpha suffix or no suffix at all will be provided to or received from controllers having the same alpha suffix or absence of suffix.

Signals E3', E4' and E5' from modem 4 are converted from V.35 type signals to TTL type signals by converter means 20 and provided to converter means 24. Converter means for converting V.35 signals to TTL signals may use National Semiconductor part DS 3650. The converted signal E5 is also provided to lamp means 26 which lights when modem 4 is providing data. Converter means 24 provides V.35 type signals E3, E3A, E3B, E3C, E4, E4A, E4B, E4C, E5, E5A, E5B and E5C. Converter means which convert TTL type signals to V.35 type signals use parts which may be of the type manufactured by Texas Instruments as their part SN 75110 with a modification for converting a current signal to a voltage signal.

Each RS 232 type signal E6, E6A, E6B or E6C from controller 8, 8A, 8B or 8C, respectively, is converted by converter means 30 to a TTL type signal and provided to logic means 34. Logic means 34 provides a TTL type signal, in accordance with the converted signal from converter means 30 as hereinafter explained, to converter means 37 which provides a RS 232 type signal E6 to modem 4.

Similarly, converter means 40 receives a V.35 type signal E7, E7A, E7B or E7C from controller 8, 8A, 8B or 8C, respectively, and converts it to a TTL type signal. Converter means 40 provides the converted signal to logic means 34. Logic means 34 provides a corresponding signal to converter means 44 which converts the signal to a V.35 signal E7 and provides it to modem 4. Lamp means 45 lights when signal E7, transmit data, is a a binary one level.

A V.35 type signal E8, E8A, E8B, or E8C is received from a controller 8 8A, 8B, or 8C and converted by converter means 46 to a TTL type signal which is provided to logic means 34. Logic means 34 provides a corresponding TTL type signal to converter means 50 which converts it to a V.35 type signal E8 and provides signal E8 to modem 4. Converter means 53 converts signal E9 from modem 4 which is an RS 232 type signal to a TTL signal which is provided to logic means 34 and to lamp means 54. Lamp means 54 lights when signal E9, clear to send, is at a binary one level. Logic means 34 provides a corresponding TTL type signal to converter means 56 which provides a group of signals E9, E9A, E9B and E9C to controllers 8, 8A, 8B and 8C, respectively.

Logic means 34 also provides signals to lamp means 60 through 63. Each lamp means of lamp means 60 through 63 lights when a corresponding enable signal of ENA1, ENA2, ENA3 and ENA4 is at a binary one level.

Logic means 34 is best described by the following logic equations:

$$ENA1 = RTS1 \cdot \overline{ENA2} \cdot \overline{ENA3} \cdot \overline{ENA4} \quad (1)$$

$$RTS \text{ (modem)} = ENA1 + ENA2 + ENA3 + ENA4 \quad (2)$$

$$XMIT \text{ DATA (modem)} = (XDATA1 \cdot ENA1) + \quad (3)$$

$$(XDATA2 \cdot ENA2) + (XDATA3 \cdot ENA3) + (XDATA4 \cdot ENA4)$$

$$XCLK \text{ (modem)} = (XCLK1 \cdot ENA1) + \quad (4)$$

$$(CLK2 \cdot ENA2) + (XCLK3 \cdot ENA3) + (XCLK4 \cdot ENA4)$$

where "+" means logical "or" and "." means logical "and".

A common ground line GND is carried from modem 4 through multiple access means 12 to controllers 8 through 8C where ENA1, ENA2, ENA3, ENA4 are interval signals of logic means 34 and are derived from the group of signals E6, E6A, E6B and E6C with equation 1 also being representative of ENA2, ENA3 and ENA4, RTS (modem) is signal E6' provided to modem 4; or from address signals provided by the computer. XDATA1, XDATA2, XDATA3 and XDATA4 are signals E7, E7A, E7B and E7C, respectively from controllers 8, 8A, 8B and 8C, respectively; XMIT DATA (modem) is signal E7' provided to modem 4; XCLK1, XCLK2, XCLK3 and XCLK4 are signals E8, E8A, E8B and E8C, respectively, from controllers 8, 8A, 8B and 8C, respectively. XCLK (modem) is signal E8' provided to modem 4.

What is claimed is:

1. An improvement to a remote station having computer terminals which communicates at a predetermined rate prior to said improvement with a computer by way of telephone lines, comprising:

modem means connected to the telephone lines for converting signals carried by the telephone lines to signals suitable for a controller and for converting signals from a controller to signals provided to the telephone lines;

at least two pluralities of terminals;

at least two controllers, each controller being connected to a corresponding plurality of terminals; and means connecting the modem means to the controllers for deriving a set of signals for each controller in accordance with the signals from the modem and for deriving a set of signals for the modem from signals provided by the controllers in a manner so that the remote station computer terminals communicates with the computer at substantially the predetermined rate;

said signal deriving means includes:

first converter means connected to said modem means and to all the controller means for converting a first plurality of V.35 type signals from the modem means to a greater plurality of V.35 signals and providing the greater plurality of V.35 signals to the controllers in a manner so that each controller in effect receives the first plurality of V.35 type signals, second computer means connected to the modem means and to all the controllers for converting a first plurality of RS 232 type signals from the modem means to a greater plurality of RS 232 type signals and providing the greater plurality of RS 232 type signals to the controllers in a manner so that each controller in effect receives the first plurality of RS 232 type signals, third connecter means connected to all the controllers for converting RS 232 type signals from the controllers to a TTL signal, fourth converter means connected to all the controllers for converting V.35 type signals from the controllers to a TTL signal, fifth converter means connected to the modem means for converting an RS 232 type signal from the modem to a TTL signal, sixth converter means connected to the modem means for converting a TTL signal to an RS 232 type signal and providing the RS 232 type signal to the modem means, seventh converter means connected to the modem means for converting a TTL type signal to a V.35 type signal and providing the V.35 type signal to the modem means, eighth converter means connected to all the controllers for converting a TTL signal to a plurality of RS 232 type signals and providing the RS 232 type signals to the controllers in a manner so that each controller receives a RS 232 type signal, and control means connected to the third through eighth converter means for controlling the TTL type signals in a manner so that only one of the controllers is in communication with the computer at one time.

2. An improvement as described in claim 1 in which the first converter means converts the V.35 signals from the modem to TTL type signals and then converts the TTL signals to a greater plurality of V.35 signals.

3. An improvement as described in claim 2 in which the second converter means converts the plurality of RS 232 type signals to TTL signals and converts the TTL signals to the greater plurality of the RS 232 type signals.

4. An improvement as described in claim 3 in which the signals in the plurality of signals being converted by the first converter means are the carrier detect signal and the data set ready signal; the signals in the plurality of signals being converted by the second converter means are the transmit clock signal, the receive clock signal and the receive data signal and the signals being converted by a third converter means are request to send data; the signal provided by the seventh converter means is the request to send data; the signals converted by the fourth converter means are the transmit data signals; the signal provided by the eighth converter means is the transmit data signal; the signal converted by the fifth converter means is the modem clear to send signal, and the signals provided by the sixth converter means are the modem clear to send signals.

5. An improvement as described in claim 4 further comprising:

a plurality of lamp means, a first lamp means being connected to the second converter means in such a manner as to indicate that the receive data signal is at a binary one level, a second lamp means connected to the seventh converter means and the control means for indicating that data is being transmitted to the modem, third lamp means connected between the fifth converter means and the control means indicating that the modem clear to send signal is present, and fourth, fifth, sixth and seventh lamp means for indicating which of the controllers is enabled to send or receive data.

6. An improvement as described in claim 5 further comprising:

ninth converter means connected to all the controllers for converting a second plurality of V.35 type signals from the controllers to a TTL signal and providing the TTL signal to the control means, tenth converter means connected to the modem means for converting a TTL signal from the control means to a V.35 signal provided to the modem means.

7. An improvement as described in claim 6 in which the signals being converted by the ninth converter means are modem transmit clock signals and a signal being provided by the tenth converting means to the modem means is the modem transmit clock signal.

8. An improvement as described in claim 7 in which the normal speed of communication between the controllers and the computer is 56,000 bits per second.

9. An improvement as described in claim 8 in which the numbers of controllers in the station do not exceed four.

* * * * *